United States Patent [19]

Ross et al.

[11] Patent Number: 4,544,584
[45] Date of Patent: Oct. 1, 1985

[54] CULTURED ONYX PRODUCTS AND METHODS THEREFOR

[76] Inventors: Gilbert B. Ross, 17640 Vincennes St., Northridge, Calif. 91324; Theodore E. Stevens, 295 View Crest Dr., Azusa, Calif. 91702

[21] Appl. No.: 572,358

[22] Filed: Jan. 20, 1984

Related U.S. Application Data

[62] Division of Ser. No. 146,749, May 5, 1980, Pat. No. 4,433,070.

[51] Int. Cl.$^4$ .................. C08L 67/06; B29C 9/00
[52] U.S. Cl. ..................... 428/15; 523/171; 264/73; 264/77
[58] Field of Search ............. 264/73, 75, 76, 77; 428/15; 523/171

[56] References Cited

U.S. PATENT DOCUMENTS

| | | | |
|---|---|---|---|
| 2,987,496 | 6/1961 | Simpson | 523/171 |
| 3,396,067 | 8/1968 | Schafer | 428/15 |
| 3,562,379 | 2/1971 | Duggins | 428/15 |
| 3,585,094 | 6/1971 | Ruggles | 428/542 |
| 3,687,793 | 8/1972 | Bright | 428/15 |
| 3,906,065 | 9/1975 | Schneider et al. | 264/75 |
| 4,137,215 | 1/1979 | Van Gasse | 264/73 |
| 4,343,752 | 8/1982 | Cann | 264/73 |

FOREIGN PATENT DOCUMENTS

| | | | |
|---|---|---|---|
| 2719024 | 11/1977 | Fed. Rep. of Germany | 523/171 |
| 2491784 | 4/1982 | France | 264/73 |
| 154452 | 12/1979 | Japan | 523/171 |
| 0032646 | 3/1980 | Japan | 264/75 |

*Primary Examiner*—John E. Kittle
*Assistant Examiner*—James J. Seidleck
*Attorney, Agent, or Firm*—Louis J. Bachand

[57] ABSTRACT

Cultured onyx, cultured marble, and like mineral-appearing products are provided, as well as intermediates and components and methods therefor through the combination of a locally discontinuous phase comprising a synthetic organic resin portion hardened to a predetermined hardness and a visually distinguishable continuous phase comprising a synthetic organic resin portion separately hardened to the predetermined hardness with the discontinuous phase intimately distributed therein, to form shaped structures having surfaces simulative of onyx, marble, or like naturally occurring mineral in appearance, which surfaces are uniformly polishable in phase undifferentiated relation.

11 Claims, 3 Drawing Figures

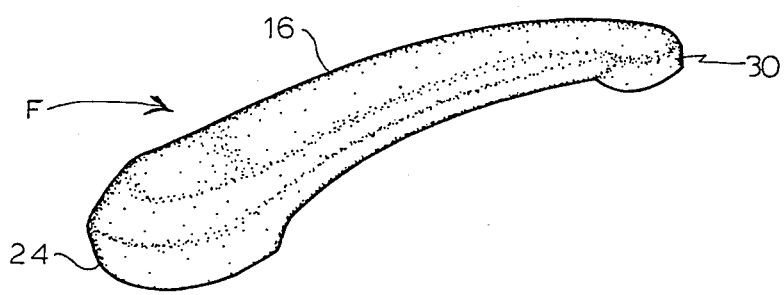
FIG. 1
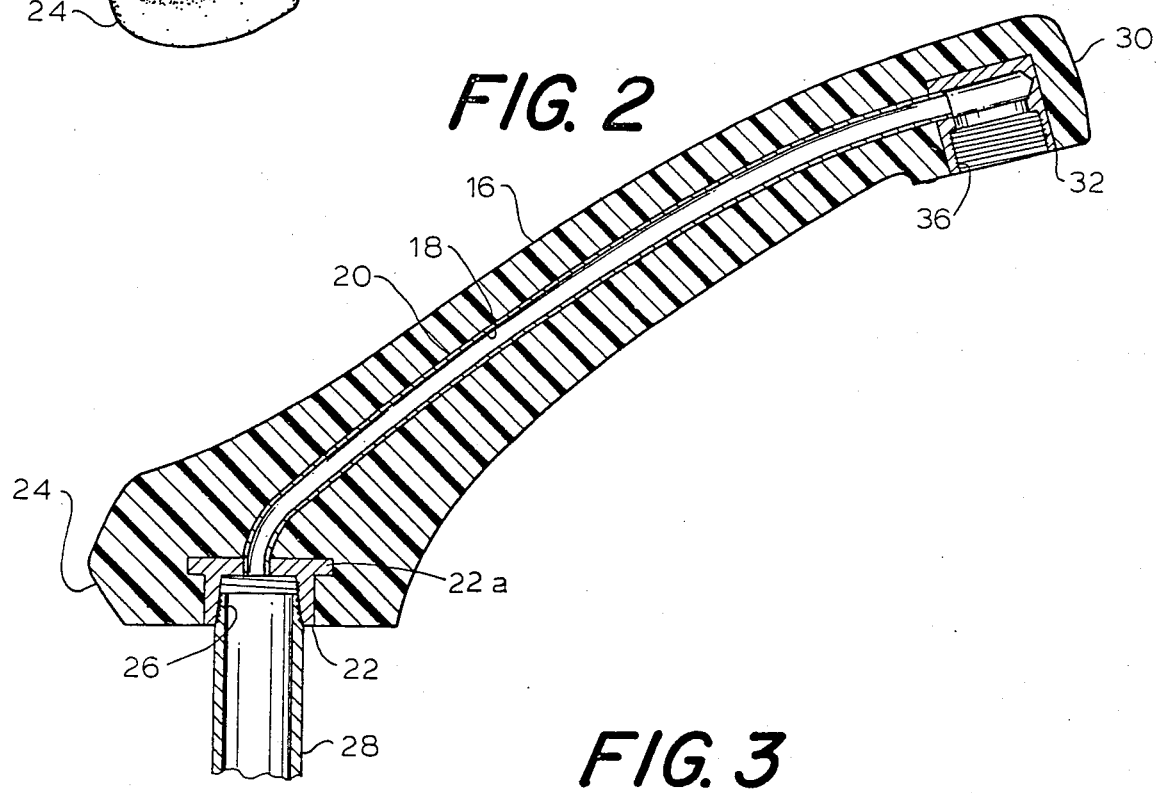
FIG. 2
FIG. 3
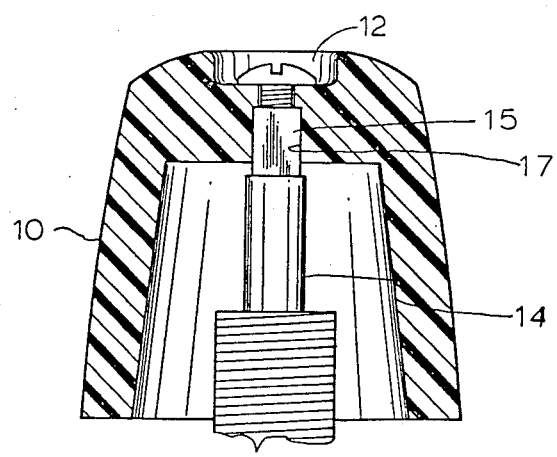

CULTURED ONYX PRODUCTS AND METHODS THEREFOR

This application is a division of application Ser. No. 146,749 filed May 5, 1980 now U.S. Pat. No. 4,433,070.

This invention has to do with products simulative in appearance to the naturally occurring semi-precious silicas known as onyx, or to like minerals such as marble. More particularly, the invention is concerned with novel materials and methods and mineral simulative products resulting therefrom, characterized by enhanced fidelity to natural materials in appearance, in improved resistance to deterioration in their expected use environment, reduced weight for lower cost shipping, and in versatility of design configuration. Moreover the present materials, methods and products are achieved at significant reductions in manufacturing costs by virtue of the elimination of various manufacturing steps heretofore thought necessary in the cultured onyx and cultured marble industry. In the ensuing description, cultured onyx will be primarily referred to as an ideal illustrative embodiment of the practice of the invention.

A large market exists for tubs, pullmans, tile, tub enclosures, plaques, sculptures, and other shaped products having the uniquely attractive, nearly nacreous layered translucent depth of onyx, an optical effect heightened by the presence of subtly or strongly contrasting, diffuse striations of visually differeniatable localized zones of concentration of contrastant having indistinct mergence with the surrounding matrix in three dimensions. In general, this market has been supplied with products based on a polyester resin matrix extended and optically modified with a filler comprising tiny glass particles, referred to as frit.

PRIOR ART

In U.S. Pat. No. 3,396,067 to K. A. Schafer the simulation of naturally occurring onyx in a wide variety of useful products is taught to be achievable by blending polyester resins filled with one or another fillers, e.g. silicas and more particularly glass frit in a specific manner to interdistribute essentially alike polyester phases and thereafter simultaneously curing all the polyester to hardness with one phase frozen in another. The disadvantages of the technique taught include obtention of a nonpolishable surface and excess weight since glass is more than twice as heavy as polyester resin and so hard relative to the polyester that surface polishing produces a multiplicity of discrete islands too small to really be seen and too numerous to count but which in the aggregate appear as a surface dullness which increases with polishing rather than diminishing. Thus those in the art having only the Schafer process and product have resorted to gel coats, surface coverings of clear resin, which are polished appearing, to conceal the true surface and thus beautify the product. Unfortunately, this expedient brings its own problems, since gel coats may be rubbed through by too vigorous cleaning, which may occur in a washbasin, for example. Too they are typically water vapor pervious, and over time, in use, they permit water seepage into the underlying structure which is manifested by a separation of the gel coat from the substrate, and the resultant appearance of an air pocket or bubble behind the gel coat which is disruptive of the light reflection and spoils the product aesthetics.

SUMMARY OF THE INVENTION

It is therefore a major objective of the present invention to provide novel cultured mineral products, having the surface appearance of, e.g. cultured onyx and cultured marble. It is another objective to provide such products in the form of shaped articles having: the requisite surface appearance; lighter weight for reduced shipping costs; tougher surfaces against in-use degradation; uniform polishability deriving from chemical and physical property homogeneity at the surface; freedom from costly gel coats which are likely to wear or lift off from water vapor permeation; ease of shape forming into conventional as well as nonconventional, artistic and aesthetic products; increased variety of visual effects through limitless variation in color, size, uniformity of size, concentration, distribution, and patterning of the filler, colorants, and matrix relative one to the other, as compared with previously known cultured mineral products, such as cultured onyx. It is a further objective to provide method for the preparation of cultured onyx and like products which is economical, productive of enhanced aesthetic effect, and free of requirements for gel coat cover up of surface imperfections inherent in prior art methods. It is a particular object to provide product comprised of individually hardened portions of a chemically alike resins whereby surface imperfections deriving from different hardness materials at the product surface are avoided. Another highly importnt object is to provide cultured marble or onyx simulative shaped articles and products such as tubs, tub enclosures, lavabos, pullmans, basins and vases, fixtures, fountains and the like which are free of internal hygroscopicity inducing agents such as glass and which thereby are impervious to humid environments or water contact and able to be free of gel coats whereby unsightly lifting of film at the product surface is avoided and the aesthetic and practical use life of the product greatly extended. Still other objectives include having like density components against gravity separation in lay-up, deriving the matrix and filler portions from the same resin, preferably a polyester resin, with each portion being hardened in a separate step, and the provision of a universal filler system comprising neutral color resin particles triturated to the proper size range and used with individual coloration in the matrix resin which is only then cured with the filler cooperating with the the colorant, or more broadly the contrastant, since apparently similar colors of matrix and filler are distinguishable as optically varying when the particles of filler are distributively disposed in locally concentrated relation in the surrounding, product shape defining resin. Further objectives include providing methods of molding shaped products, methods of preparing intermediates, and techniques for obtaining the optimum in cultured onyx and like mineral product appearance with maximum beneficial physical and chemical properties, and the provision of products having water receiving receptacles and conduit therein, and withal the appearance of onyx, marble and like naturally occurring materials, but of infinitely variable shape and utility.

These and other objects of the invention to become apparent hereinafter, are realized in accordance with the invention which provides a shaped structure having a polishable cultured onyx, cultured marble, or like mineral-appearing surface of predetermined hardness, the structure comprising a locally discontinuous phase comprising a synthetic organic resin portion hardened to the predetermined hardness and a visually distinguishable continuous phase comprising a synthetic organic resin portion separately hardened to the predetermined hardness with the discontinuous phase intimately distributed therein, whereby the structure surface is simulative of onyx or like mineral appearance and uniformly polishable in phase undifferentiated relation.

The locally discontinuous resin portion typically comprises particles of resin hardened to the predetermined hardness prior to intimate combination with the continuous resin portion and which are less than about 50 U.S. mesh in mean average particle size diameter. The discontinuous resin portion particles preferably comprise polyester resin.

The continuous resin portion also preferably comprises polyester resin and embeds the discontinuous portion in local discontinuity and distribution defining relation.

The locally discontinuous resin portion particles of hardened resin may have a mean average particle size diameter less than about 80 U.S. mesh.

Typically, the discontinuous resin portion particles comprise from about 5% to 55% of the weight of the structure.

In particularly preferred embodiments, the continuous resin portion and the discontinuous portion are each polymers of the same monomer, e.g. each polyester resin.

The structure typically also includes a colorant distinguishable within the continuous phase, e.g. dispersed nonuniformly in continuous phase. Further the discontinuous phase is typically particulate, uniformly distributed in the continuous phase, and the structure also includes a colorant nonuniformly dispersed in the continuous phase.

The invention contemplates provision of a moldable mixture hardenable into the foregoing product, i.e., a resinous mass for the production of cultured onyx, cultured marble, or like mineral product comprising visually distinguishable portions of synthetic organic resin, including a first, major weight portion defining a continuous, moldable and hardenable resin matrix, a second, minor weight portion defining a particulate, pre-hardened resin filler of less than about 50 U.S. mesh in mean average particle diameter, the second resin portion particles having discontinuous distribution in the first resin portion matrix, and a colorant visually distinguishably marking the product with randomly localized zones of distributed filler concentration, the zones having indistinct mergence with the surrounding matrix in three dimensions after mold-shaping and hardening of the matrix portion simulatately of the surface appearance of onyx, cultured marble, or like mineral.

The second resin portion typically constitutes from 25% to 50% by weight of the resinous mass, and the first portion or matrix is hardenable with the filler in situ to the hardness of the filler to have both filler and matrix portions which may be polymers of the same monomer substantially equally wear resistant to polishing on the product surface.

The invention further contemplates provision of an intermediate for inclusion in the above moldable resinous masses, as well as in the mineral like final product. This intermediate according to the invention comprises resinous particles for the production of cultured onyx, cultured marble, or like mineral product by combination in effective proportion with visually distinguishable synthetic organic resin, the resinous particles comprising polyhedral chips of a relatively large, hardened mass of synthetic organic resin, the particles being useful without further hardening, preferably comprised of polyester, and having a mean average particle size diameter of less than about 50 U.S. mesh. The resinous particles after being chipped from the relatively large mass e.g. under low temperature conditions, may have a colorant added, where the large mass is not of a visually distinctive color tone relative to the tone of the intended matrix resin portion, e.g. by incorporation of colorant for visually distinguishing the particles relative to the synthetic organic resin matrix.

The combining of the foregoing particulate filler with the hardenable matrix, into the blend described above produces after molding to a desired shape a shaped cultured onyx, cultured marble, or like mineral-appearing product having a predetermined surface hardness and comprising first and second, visually distinguishable portions of synthetic organic resin, including a first, major weight portion defining a continuous, molded post-hardened resin matrix, a second, minor weight portion defining a particulate, pre-hardened resin filler of less than about 50 U.S. mesh in mean average particle diameter, the second resin portion particles comprising polyhedral chips of a relatively large hardened resin mass and having discontinuous distribution in the first resin portion matrix in a manner visually marking the product with distributed filler having indistinct mergence with the surrounding matrix in three dimensions simulatively of the appearance of onyx, cultured marble, or like mineral. As in previous embodiments, a colorant may be nonuniformly distributed in the resin matrix to enhance the simulative effect, the locally discontinuous resin portion chips may be colored with added colorant, comprise polyester resin, and be less than about 80 U.S. mesh in mean average particle size diameter; the continuous resin portion may also comprise polyester resin, e.g. the continuous and discontinuous portions may be polymers of the same monomer, and embed the discontinuous portion and colorant in local discontinuity and distribution defining relation; and the discontinuous resin portion particle chips typically comprise from about 25% to 55% of the weight of the product, and may be artificially colored.

In one highly useful form of the invention, water receptacles, such as pullmans, lavatories, water closets, tubs, and other receptacle apparatus such as faucets, faucet handles and spigots, the shaped product includes means defining a passage within the product, for the passage of water or other fluid, for receiving bolts, screws and other fastening hardware, or for defining a wall aperture for water flow or insertion of fixtures.

For this purpose the shaped product passage defining means in faucet and piping applications will typically include a separately formed conduit member, e.g. brass tubing, the product further defining means to maintain the member within the passage, such as end fittings adapted to be sweated onto the brass tubing and to threadedly engage aerators and mounting bosses in product installations.

The invention also contemplates method of manufacturing a cultured onyx, cultured marble, or like mineral-appearing surface structure, which includes combining with a first hardenable synthetic organic resin portion a second pre-hardened particulate synthetic organic resin portion, the first resin portion being hardenable to a like hardness to the second resin portion, hardening the first resin portion with the second resin portion distributively disposed in situ therein to the like hardness in the desired form of the structure. The method further may include adding powdered, or liquid colorant, hardening the second resin portion in a relatively large mass and triturating the mass, after freezing to aid crushing, if desired, to obtain the desired amount of the desired size particulate.

It is signal feature of the present invention and method that by virtue of the like hardnesses of the resin portion phases it is possible to polish the surface of the structure to a uniform gloss, without use of an overlayer of gelling resin, i.e. in gel coat free relation.

With further reference to the present method, it includes also hardening a polyester resin as the second resin portion, triturating the hardened resin portion to a particulate mass having an average mean particle size diameter of less than about 50 U.S. mesh and combining the second resin portion with a first resin portion comprising hardenable polyester resin; proportioning the first and second resin portions so that the said second resin portion constitutes from 25% to 50% of the structure by weight; depositing the combined resin portions into a structure-defining form prior to hardening of the first resin portion; adding locally concentrated marblizing colorant to the mixed portions and gently swirling or stirring to combine without mixing to define the onyx or marble simulative striations; and thereafter hardening the first resin portion with the prehardened second resin portion distributively disposed therein; maintaining a passage within the combined resins during hardening of the first resin into a structure; and disposing a preformed, e.g. passage-defining element in the combined resins prior to hardening of the first resin to maintain a passage therewithin.

Alternatively stated, the invention contemplates the method of manufacturing a cultured onyx, cultured marble or like mineral-appearing structure, which includes confining in a forming zone previously hardened, particulate polyester resin and a visually distinguishable, liquid, hardenable polyester resin in distributively commingled relation and colorant in such relative proportions and patterns as to provide an onyx, marble or other mineral simulative surface appearance, and hardening the hardenable portion while confining the resin within the zone, and the product made by the method.

Further there is contemplated in a cultured onyx, cultured marble or like mineral-appearing product comprising a hardened resin matrix and a particulate filler distributed therein in visually varying relation, the improvement in which the filler comprises a separately hardened portion of a chemically like resin to the matrix resin, whereby the surface of the product is visually varied and compositionally uniform.

And still further contemplated is a cultured onyx, cultured marble, or like mineral-appearing structure filler comprising a synthetic organic resin portion, e.g. of polyester, hardened to a hardness desired in a final structure, and triturated to particulate form having a mean average particle size of less than 50 mesh, and having an added colorant if desired, for use in such product manufacture.

There is also provided the method of manufacturing resinous particulate filler, including forming a body of hardened resin, freezing the body, and thereafter locally impacting the body in body-fracturing relation, further reducing the fracture product by impact at below room temperature, and using nitrogen or carbon dioxide for either or both fracture and further reduction operations, as the source of cold therefor.

BRIEF DESCRIPTION OF THE DRAWING

The invention will be further described as to an illustrative embodiment thereof in conjunction with the attached drawing, in which:

FIG. 1 is a perspective view of a shaped product, namely a faucet produced in accordance with the methods of the invention, using the compositions of the invention;

FIG. 2 is a view in horizontal section thereof; and

FIG. 3 is a view in vertical section of a faucet handle shaped product according to the invention.

DESCRIPTION OF THE PREFERRED EMBODIMENTS

The present invention uses a resin portion as filler. The resin filler is prepared by hardening a heat or catalytically curable liquid resin, such as polyester, or other resin as described below, in bulk to form a solid body of hardened resin. The degree of hardening is not narrowly critical, with typical resin bodies being not friable but trituratable by application of grinding or abrading force. Thus a body of hardened resin is triturated to a fine powder comprised of discrete particles of generally polygonal shape, by impacting at high centrifugal speed against circularly fixed teeth under temperature conditions conducive to embrittlement of the resin body so as to facilitate erosion of the body and generation of particulate. Crushing of the resin body after freezing is effective, with the resultant lumps being further refined by high speed impact with appropriately arranged teeth, also under lowered temperature conditions where resin gumming may occur. A grind to at least 50 U.S. mesh mean average particle size diameter is usually required for obtaining a cultured onyx product, although other minerals having coarser, even grainy striations may be made with coarser particulate, and grinding will not have to be so fine. A mean average particle size of 80 U.S. and below is preferred for optimum subtlety of transition from accent to background in cultured onyx. Typically the hardened resin body is coarsely divided and the coarse pieces impacted against teeth until a particulate of the desired size distribution is realized.

The particulate filler may be the color of the resin body which in a polyester resin tends to be a water white to gray in the absence of added colorant. A colorant, i.e. a material imparting a color value other than the naturally occurring color, may be added to the resin, e.g. before hardening, for example an organic or inorganic dye and/or pigment, liquid or solid powder, may be added to a slurry of the polygonal chips in uncured resin or other vehicle prior to addition of the particulate to the matrix resin. Advantageously, a masterbatch of chips may be prepared and specific colorants added as need be from time to time for product production purposes, thus to minimize inventory of colors. The use of reactive color formers on the particulate is also practical, the color being developed in situ in the product. The color may be any tone including deepened or lightened aspects of the eventual matrix color. In this connection, it is the presence of visual distinguishability through the presence of a contrast between the phases of the product that is important, not specific color contrasts. The polyester resins for example exhibit contrast between commingled phases regardless of a colorant as an additional contrastant.

The hardened filler is then mixed with the matrix material, suitably a further portion of the filler resin. Colorant to form localized concentrations of high contrast, e.g. striations, bursts, veins, whorls, umbras and the like, typical of onyx and marble is added. The mix is controllably agitated or not as desired to achieve the nonuniform, locally randomized, concentration pattern of distribution of colorant in the uniformly comixed filler and matrix. Swirling, agitating, adding from single or multiple points in thick or thin streams all have their effect on the final pattern. It is preferable to slowly combine a first mix of a given background color of liquid, nonhardened matrix and the hardened filler particulate with a second mix of another background color of liquid, nonhardened matrix resin and the hardened filler and to combine these different background color mixes with pigment or other pattern forming colorant, with careful definition of distribution, and then to add the combined mixes and colorant to the mold to be used to shape the product structure using more or less percentage of particulate filler to vary the viscosity of the combined mixes for application to the form and to determine the apparent concentration of pattern in the final product desired, more mixing reducing colorant concentration and less mixing maintaining an initial pattern of distribution. The substantially equivalent specific gravities of the filler and matrix in the invention preferred compositions give a high degree of control over distribution pattern not available where the filler for example is far heavier than the matrix, as in prior art systems.

The relative quantities of filler and matrix for achieving a cultured onyx appearance is between about 5% and 55% of filler on the total weight of the product, with the balance being matrix, colorant and any specific additives employed. Typically, colorant is added at the rate of about 0.1 to 1.5% of the total weight of the product. The term "product" herein refers to the combination of two resin phases, without regard to colorants, contrastants, extenders, and nonresin components present in a final shaped structure. This ratio again is for achieving the best appearing cultured onyx product, other mineral simulations can use other ratios, e.g. from as little as 0.5% filler to as much as 75% filler by weight, based on the weight of the product, the matrix conversely comprising from 99.5% to as little as 25% by weight of the product.

After the combined resins are placed in a suitable mold, the matrix resin is cured, by heat and/or catalysis with the filler resin in situ therein. A signal feature of the present invention is the cohardening of the matrix to the hardness of the filler or approximately so, to a degree affording a polishability to the filler and matrix phases at the product surface which is uniform across the phases. The result is that upon polishing, by sanding, buffing and/or light grinding, both phases wear, or do not wear, but do so evenly and uniformly, so that islands of relatively harder filler do not protrude, as happens with glass frit fillers, as polishing progresses. In the present products, the filler and matrix wear at the same rate, i.e. without phase differentiation where the filler and matrix are hardened to the same degree.

Molding of the combined resin phases is acomplished simultaneously with the hardening of the matrix about the prehardened filler. The final shape of the product is determined by the mold as in other molding processes.

The mold may typically define a tub or wash basin, or countertop or the like. Advantageously with the present method and products, shaped articles of increased value relative to their resin content can be formed reliable and easily. For example, faucets and handles for operating water control valves can be readily molded of the present moldable combination of hardened and unhardened resin.

With reference now to the accompanying drawing, a faucet is depicted in FIGS. 1 and 2. The faucet F is shown to comprise a neck portion 16 and a base 24, the base being centrally recessed to receive a brass fitting 22 with the fitting annular shoulder 22a being embedded within the molded faucet for security of fit. A conventional threaded conduit 28 extending from household plumbing (not otherwise shown) is threaded into the faucet fitting 22 at 26. A preformed element in the form of a conduit 20 of plastic or brass extends through the faucet neck 16 defining a water passage 18 therethrough. The conduit 20 is sweated to the fitting 22 at one end and to the fitting 32 at the faucet nozzle 30. Nozzle fitting 32 is suitably molded in place and interiorly threaded at 36 to receive a conventional aerator.

The received preformed element can be any structure which lends a particular utility to the final molded product. In a faucet handle, for example, and with particular reference to FIG. 3, the knob 10 defines the handle and is provided with a central top recess 12 which receives for subsequent concealment under a hot/cold tab, a valve stem 14 through bushing 15 which is fitted in the central bore 17 of the handle.

Resins useful herein for formation of one or both of the two phases, i.e. the locally discontinuous phase and/or the continuous phase are those resins which harden to useful rigidities for use as structural products. First among such resins for onyx simulation is the polyester resin. Polyester resins are well known and amply described for example in the 1979–1980 Modern Plastics Encyclopedia. Such resins are the reaction product of a dibasic acid and a glycol, e.g. phthalic anhydride, isophthalic acid and adipic acid with one or more of propylene glycol, ethylene glycol, diethylene glycol and dipropylene glycol. Crosslinking monomers used include styrene, vinyl toluene, methyl methylmethacrylate, methyl styrene, and diallyl phthalate. Inhibitors such as quinone, hydroquinone and butyl catechol may be used. Typical catalysts for the reaction are free radical precursors, e.g. the peroxides which decompose at elevated or ambient temperatures, e.g. methyl ethyl ketone peroxide, cyclohexanone peroxide, and benzoyl peroxide, or cumene hydropentoxide, t-butyl perbenzoate and peroctoate. Resins of less intrinsic clarity will be useful where the ultimate in translucency is not required. Accordingly such thermosetting (including room temperature cure) resins as allyls, ureas, phenolics, polyimides, epoxy, and polyurethanes, may be used in particular cases.

It is particularly preferred herein to employ different portions of the same resin as the raw material for the two distinct phases, one to be hardened and triturated, then distributed in the other portion, whereupon the second portion is the hardened, giving a two phase composition with the difference being not chemical or physical but related to form (continuous or discontinuous) and derived from the time of cure or hardening.

EXAMPLE

A polyester resin was hardened by the application of moderate temperature, ca. 175 degrees for a period of 60 minutes in a simple rectangular mold to provide a body of hardened resin weighing about 5 pounds. The body was frozen instantly in liquid nitrogen and crushed in an impact mill into pieces approximately ¼ by ¼ inches on a side, and these pieces fed centrifugally against a series of teeth in a circular path to reduce the pieces in after sufficient passes to polyhedral chips of nonsymmetrical shape and of a mean average particle size of 80 U.S. mesh screen. The particles were combined with a color pigment in a quantity of liquid uncured resin of the same type. A further portion of this polyester resin was combined with particulate, and without the addition of any colorant. These mixtures were then combined to achieve a ratio of 48% particulate by weight relative to the nonhardened resin. Colorant in the form of liquid pigment was distributively added to the combined resins, and a swirl pattern established. The combined resin portions and swirled colorant therein were cast in a faucet mold and the the resin matrix as had been the particulate to achieve like hardness. The preformed element, e.g. the conduit and fittings is inserted in the mold in suitably supported relation prior to cure if it is desired to have the element embedded. The part was removed from the mold and lightly buffed to a high gloss. The onyx like translucent striation and veining was striking, both in depth and diffusion below the article surface and in its feathering off into indistinct mergence with the surrounding matrix beyond its locus of concentration, the interposition of solid filler through the matrix liquid serving to give the localized concentrations of striation defining colorant an imperfection of line and edge definition which heightens the comparability to naturally occurring striated, color marked minerals.

Water vapor exposure did not affect the product surface on testing. The absence of a gel coat on the product is to be noted. Heretofore high gloss was dependent on application of a glossy film former onto the molded product, because buffing highlighted the harder filler as it eroded the softer matrix. Wih the present product, however, the filler and matrix phases are of substantially coequal hardness. The problems of film lift off and poor abrasion resistance, formerly tolerated because of the need for a high gloss on the cultured onyx or cultured marble product, have been obviated.

Accordingly, the invention provides a novel product overcoming the disadvantages of previous products and opening new opportunities for the manufacture of highly attractive cultured onyx and marble products, such as the traditional tubs, pullmans, basins, water closets, lavabos, and additionally fountains, sculptures, tiles, wall decorations, faucets and handles, soap dishes and statuary.

We claim:

1. The method of manufacturing a cultured onyx, cultured marble, or like mineral-appearing surface structure which includes combining with a first hardenable synthetic organic resin portion, a second visually distinguishable pre-hardened particulate synthetic organic resin portion, said first resin portion being hardenable to a like hardness to said second resin portion, hardening said first resin portion with said second resin portion distributively disposed in situ therein to said like hardness in the desired form of said structure.

2. The method according to claim 1, including also, adding colorant, hardening said second resin portion and triturating to the desired size particulate.

3. The method according to claim 2, including also polishing the surface of the structure to a gloss in gel coat free relation.

4. The method according to claim 2, including also hardening a polyester resin as said second resin portion, triturating the hardened resin portion to a particulate mass having an average mean particulate size diameter of less than about 50 U.S. mesh and combining said second resin portion with a first resin portion comprising hardenable polyester resin.

5. The method according to claim 1, including also proportioning the first and second resin portions so that the said second resin portion constitutes from 25% to 50% of said structure by weight.

6. The method according to claim 1, including also depositing said combined resin portions into a structure-defining form prior to hardening of said first resin portion, and thereafter hardening said first resin portion with said prehardened second resin portion distributively disposed therein.

7. The method according to claim 6, including also maintaining a passage within said combined resins during hardening of said first resin into a structure.

8. The method according to claim 7, including also disposing a preformed passage-defining element in said combined resins prior to hardening of said first resin to maintain a passage therewithin.

9. The method according to claim 6, including also disposing a preformed element in said combined resins prior to hardening of said first resin.

10. The method of manufacturing a cultured onyx, cultured marble or like mineral-appearing structure, which includes confining in a forming zone a previously hardened, particulate polyester resin, a colorant, and a visually distinguishable, liquid, hardenable polyester resin in distributively commingled relation and in such relative proportions as to provide an onyx, marble or other mineral simulative surface appearance, and hardening the hardenable portion while confining the resin within said zone.

11. The product made by the method of claim 10.

* * * * *

REEXAMINATION CERTIFICATE (1500th)
United States Patent [19]
Ross et al.

[11] B1 4,544,584
[45] Certificate Issued Jul. 2, 1991

[54] CULTURED ONYX PRODUCTS AND METHODS THEREFOR

[75] Inventors: Gilbert B. Ross, Northridge; Theodore E. Stevens, Azusa, both of Calif.

[73] Assignee: Spectrum 21 Licensing Corp., New York, N.Y.

Reexamination Request:
No. 90/001,988, Apr. 9, 1990

Reexamination Certificate for:
Patent No.: 4,544,584
Issued: Oct. 1, 1985
Appl. No.: 572,358
Filed: Jan. 20, 1984

Related U.S. Application Data

[62] Division of Ser. No. 146,749, May 5, 1980, Pat. No. 4,433,070.

[51] Int. Cl.$^5$ .................. C08L 67/06; B29C 9/00
[52] U.S. Cl. .................. 428/15; 523/171; 264/73; 264/77
[58] Field of Search .................. 264/73, 75, 76, 77; 428/15; 523/171

[56] References Cited
U.S. PATENT DOCUMENTS

| | | | |
|---|---|---|---|
| 2,265,226 | 12/1941 | Clewell | 18/58 |
| 2,761,176 | 9/1956 | Welch | 18/47.5 |
| 3,692,892 | 9/1972 | Lemelson | 264/317 |
| 3,767,759 | 10/1973 | Wichterle | 264/213 |
| 4,085,246 | 4/1978 | Buser | 428/220 |
| 4,159,301 | 6/1979 | Buser | 264/331 |

FOREIGN PATENT DOCUMENTS

| | | |
|---|---|---|
| 1221781 | 7/1966 | Fed. Rep. of Germany . |
| 1376985 | 9/1964 | France . |
| 1403046 | 5/1965 | France . |

*Primary Examiner*—James J. Seidleck

[57] ABSTRACT

Cultured onyx, cultured marble, and like mineral-appearing products are provided, as well as intermediates and components and methods therefor through the combination of a locally discontinuous phase comprising a synthetic organic resin portion hardened to a predetermined hardness and a visually distinguishable continuous phase comprising a synthetic organic resin portion separately hardened to the predetermined hardness with the discontinuous phase intimately distributed therein, to form shaped structures having surfaces simulative of onyx, marble, or like naturally occurring mineral in appearance, which surfaces are uniformly polishable in phase undifferentiated relation.

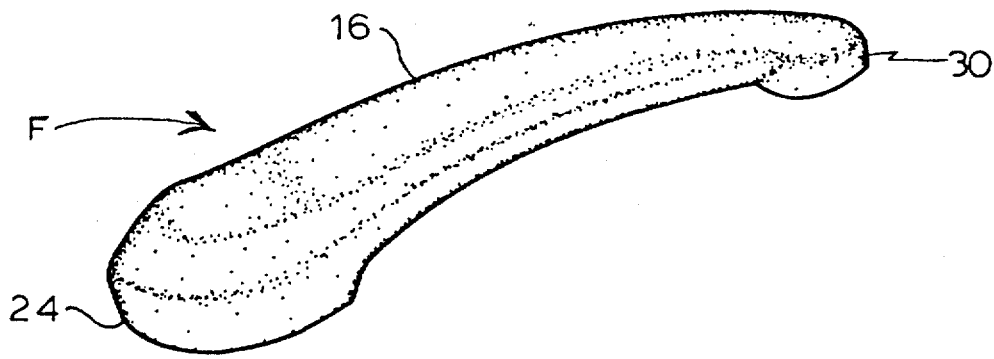

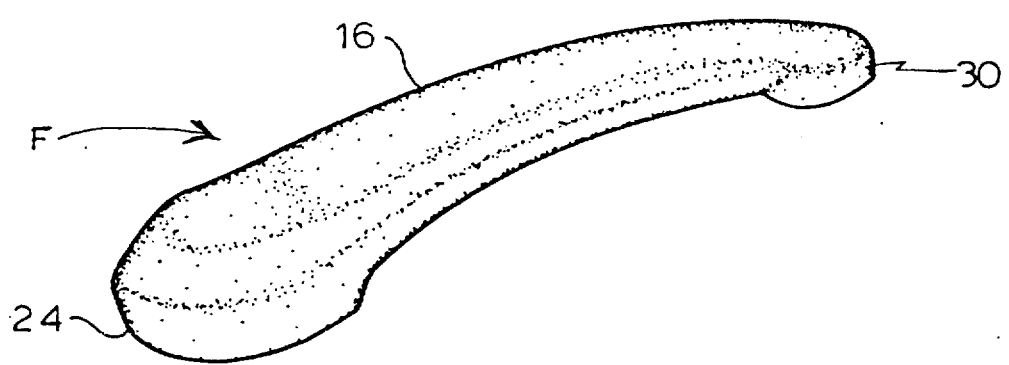

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2-9 and 11, dependent on an amended claim, are determined to be patentable.

New claims 12 and 13 are added and determined to be patentable.

1. The method of manufacturing a cultured onyx, cultured marble, or like mineral-appearing surface structure which includes combining with a *liquid* first hardenable *thermosetting* synthetic organic resin portion, a second visually distinguishable pre-hardened particulate *thermosetting* synthetic organic resin portion *comprising 5 to 55% by weight of the structure*, said first resin portion being hardenable to a like hardness to said second resin portion, *and* hardening said first resin portion with said second resin portion distributively disposed in situ therein to said like hardness in the desired form of said *surface* structure, *whereby said surface is comprised of said first resin portion and said second resin portion intimately distributed therein.*

10. The method of manufacturing a cultured onyx, cultured marble or like mineral-appearing structure, which includes confining in a forming zone a previously *completely* hardened, particulate *thermosetting* polyester resin, a colorant, and a visually distinguishable, liquid, hardenable polyester resin in distributively commingled relation and in such relative proportions as to provide *a surface comprised of said resins and having* an onyx, marble or other mineral simulative surface appearance, and hardening the hardenable portion while confining the [resin] *hardened and hardenable resins* within said zone.

*12. The method of manufacturing a cultured onxy, cultured marble, or like mineral-appearing surface structure which includes combining with a liquid first hardenable thermosetting polyester synthetic organic resin portion, a second visually distinguishable pre-hardened particulate thermosetting synthetic organic resin portion hardened completely and comprising 25 to 50% by weight of the structure, said first resin portion being hardenable to a like hardness to said second resin portion, and hardening said first resin portion with said second resin portion distributively disposed in situ therein to said like hardness in the desired form of said structure, said structure surface being polishable in phase undifferentiated relation.*

*13. The method of manufacturing a cultured onyx, cultured marble or like mineral-appearing surface structure, which includes confining in a forming zone a previously completely hardened, particulate thermosetting polyester resin, a colorant, and a visually distinguisuable, liquid hardenable polyester resin in distributively commingled relation and in such relative proportions as to provide a surface comprised of said resins and having an onyx, marble or other mineral simulative surface appearance, and hardening the hardenable portion while confining the hardened and hardenable resins within said zone, said surface structure being polishable in phase undifferentiated relation.*

* * * * *

REEXAMINATION CERTIFICATE (3558th)

United States Patent [19]
Ross et al.

[11] B2 4,544,584
[45] Certificate Issued Jun. 30, 1998

[54] CULTURED ONYX PRODUCTS AND METHODS THEREFOR

[75] Inventors: Gilbert B. Ross, Northridge; Theodore E. Stevens, Azusa, both of Calif.

[73] Assignee: Spectrum 21 Licensing Corp., New York, N.Y.

Reexamination Request:
No. 90/004,277, Jun. 17, 1996

Reexamination Certificate for:
Patent No.: 4,544,584
Issued: Oct. 1, 1985
Appl. No.: 572,358
Filed: Jan. 20, 1984

Reexamination Certificate B1 4,544,584 issued Jul. 2, 1991

Related U.S. Application Data

[62] Division of Ser. No. 146,749, May 5, 1980, Pat. No. 4,433,070.

[51] Int. Cl.$^6$ .................. B44F 9/04; C08L 67/06
[52] U.S. Cl. .................. 428/15; 264/73; 264/77; 523/171
[58] Field of Search .................. 156/61; 264/73, 264/75, 76, 77; 428/15; 523/171

[56] References Cited

U.S. PATENT DOCUMENTS

| | | | |
|---|---|---|---|
| 2,761,176 | 9/1956 | Welch et al. | 18/47.5 |
| 2,987,496 | 6/1961 | Simpson | 260/40 |
| 3,253,070 | 5/1966 | Gerson et al. | 264/108 |
| 3,396,067 | 8/1968 | Schafer | 161/5 |
| 3,570,056 | 3/1971 | Hall et al. | 19/4 |
| 3,706,825 | 12/1972 | Hall et al. | 264/75 |
| 3,847,865 | 11/1974 | Duggins et al. | 260/42.52 |
| 4,085,246 | 4/1978 | Buser et al. | 428/220 |
| 4,107,135 | 8/1978 | Duggins et al. | 260/42.37 |
| 4,159,301 | 6/1979 | Buser et al. | 264/331 |
| 4,244,993 | 1/1981 | Platka, III et al. | 428/15 |
| 4,269,798 | 5/1981 | Ives | 264/73 |
| 4,433,070 | 2/1984 | Ross et al. | 428/15 X |
| 4,961,995 | 10/1990 | Ross et al. | 428/409 |

FOREIGN PATENT DOCUMENTS

| | | | |
|---|---|---|---|
| 1403046 | 5/1965 | France. | |
| 1221781 | 7/1966 | Germany. | |
| 1174952 | 12/1969 | United Kingdom | C08F 43/08 |

OTHER PUBLICATIONS

*The Development and use of Polyester Products*, by E. N. Doyle, Copyright 1969.

*Primary Examiner*—Henry F. Epstein

[57] ABSTRACT

Cultured onyx, cultured marble, and like mineral-appearing products are provided, as well as intermediates and components and methods therefor through the combination of a locally discontinuous phase comprising a synthetic organic resin portion hardened to a predetermined hardness and a visually distinguishable continuous phase comprising a synthetic organic resin portion separately hardened to the predetermined hardness with the discontinuous phase intimately distributed therein, to form shaped structures having surfaces simulative of onyx, marble, or like naturally occurring mineral in appearance, which surfaces are uniformly polishable in phase undifferentiated relation.

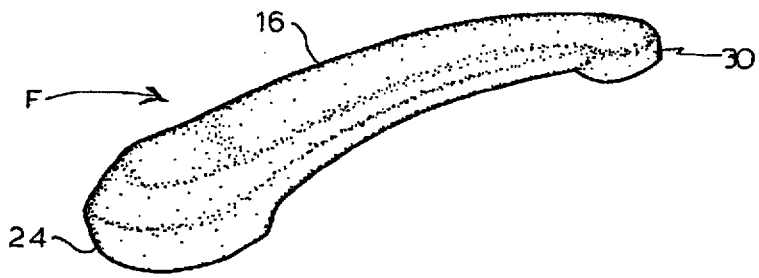

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 and 13 is confirmed.

Claims 10 and 12 are determined to be patentable as amended.

Claim 11, dependent on an amended claim, is determined to be patentable.

10. The method of manufacturing a cultured onyx, cultured marble or like mineral-appearing structure, which includes confining in a forming zone a previously completely hardened, particulate thermosetting polyester resin, a colorant, and a visually distinguishable, liquid, hardenable polyester resin in distributively commingled relation and in such relative proportions as to provide a surface comprised of said resins and having an onyx, marble or other mineral simulative surface appearance, *said hardenable polyester resin being hardenable to a like hardness to said particulate polyester resin,* and hardening [the] *said* hardenable [portion] *polyester resin with said particulate polyester resin distributively disposed therein to said like hardness* while confining the hardened and hardenable resins within said zone, *said structure surface being polishable in phase undifferentiated relation.*

12. The method of manufacturing a cultured [onxy] *onyx,* cultured marble or like mineral-appearing surface structure, which includes combining with a liquid first hardenable thermosetting polyester synthetic organic resin portion, a second visually distinguishable pre-hardened particulate thermosetting synthetic organic resin portion hardened completely and comprising 25 to 50% by weight of the structure, said first resin portion being hardenable to a like hardness to said second resin portion, and hardening said first resin portion with said second resin portion distributively disposed in situ therein to said like hardness in the desired form of said structure, said structure surface being polishable in phase undifferentiated relation.

* * * * *